April 7, 1942.     L. H. LARSON     2,279,000
ART OF COOKING
Filed April 7, 1941

INVENTOR.
LEON H. LARSON.
BY
Allen & Allen
ATTORNEYS.

UNITED STATES PATENT OFFICE 2,279,000

ART OF COOKING

Leon H. Larson, Hamden, Conn.

Application April 7, 1941, Serial No. 387,272

15 Claims. (Cl. 219—44)

My invention relates to cooking and drying of materials which are deleteriously affected by high temperature.

In cooking and drying it is desirable to supply heat input to the material being acted upon at the maximum rate. It is with many substances undesirable to bring about local overheating, a common example of which is the burning of foods in cooking when they contact with the walls of the cooking vessel.

My objective is to apply heat to material to be cooked or dried at the maximum rate while also at a temperature which is not high enough to cause local overheating. It is also my object to apply the heat over a considerable area to the vessel containing the material. It is also my object to provide for an absolute upper limit of temperature as applied to the vessel containing the material to be treated, to one which must be only slightly higher than that required for affecting the change desired in the material.

It is also an advantage in keeping the temperature of the heat applying medium down because the heat applying medium can then be retained in an insulated receptacle which is inexpensive and efficient.

Briefly I accomplish my object by utilizing a secondary liquid as a heat transfer medium and arranging its boiling point so that it is only slightly above that required for the treatment of the material which will be in a vessel contacted by the said secondary liquid. Application of heat to such a medium is then controlled so that there is active conversion of the liquid into vapor with a consequent absorption of heat units as latent heat. The vapors or incipient vapors before their escape from the secondary liquid will condense against the material containing vessel and thus transmit the latent heat to that vessel. It is important that the bottom of the material containing vessel not only touch the secondary liquid, but that this bottom and the sides be a comparatively short distance from the source of energy, so that the incipient vapor gives up its latent heat of vaporization almost immediately to the material containing vessel, rather than that it dissipate it otherwise in further heating of the secondary liquid. The material in the vessel will absorb this heat without rise in temperature beyond the vaporization point of the liquid therein. The secondary liquid will not rise in temperature beyond its boiling point (there being no use of pressure substantially beyond that of the atmosphere), hence there will be no local overheating. Although there will only be a slight gradient between the temperature of the secondary liquid and the temperature of the material being treated, there will be a good rate of heat transfer because of this mechanism of imparting latent heat and using it up again.

By the use of an electric heating coil within a vessel of inexpensive but high insulation value material, in which vessel there is the secondary liquid of the controlled boiling point, and immersing an inserted vessel of high heat conductivity in this liquid, the fullest value of my improvement can be maintained.

As compared to the familiar double boiler (not a pressure cooker) the heat transfer is much more effective because in such an instance in ordinary cooking the temperature of the inner vessel and the outer vessel come to a fairly close equilibrium figures so that the mechanism of storing up and dissipation of latent heat does not take place.

As compared to a cooker in which the boiling point of the secondary liquid is high, the great advantage is that the quantity of heat input that is desirable can in such a device, only be obtained by raising of the actual temperature of the secondary liquid much higher for a given heat input thus causing local overheating.

In certain industrial uses by improvement has great value in treatment of substances which will be broken down or modified by too high a temperature and which can advantageously be treated rapidly, i. e., with large quantity of heat input.

A concrete problem for example in cooking an aqueous suspension of a cereal, will be to supply heat to the suspension at the maximum rate but at the lowest temperature to avoid burning the substance which lies against the walls of the cooking utensils. To accomplish the task of maximum rate of heat input with a high boiling point secondary liquid will require a sharp temperature gradient between that liquid and the suspension being cooked, since mere convection and conduction of heat is the only action taking place. By my invention a much greater amount of heat can be supplied without a sharp temperature gradient by the modifying of the boiling point of the secondary liquid so as to utilize latent heat, as described.

To save in efficiency it is, of course, not desirable to boil away the secondary liquid and while observation and manual adjustment of heat input is feasible particularly in large installations, it is simple to employ a thermostatic control with an electric heating coil supply to maintain the temperature at the required degree either in the space above the secondary liquid or in the liquid at some determined point.

From another point of view my invention applies to drying of substances on jacketed drums with the heating medium kept at or lower than its boiling point and the heat input to the material being dried on the outside of the drum and being controlled by the slight gradient due to the cooling effect of the web, say of paper, on the drum exterior.

In the drawing, in which I illustrate a number of aspects of my invention, which will be described and the novelty of the invention therein duly claimed:

Figure 1:
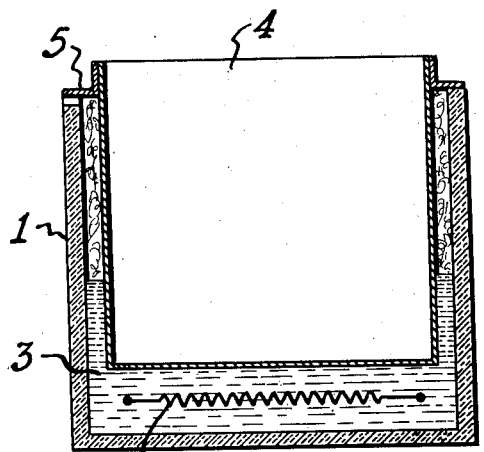
Figure 1 is a section showing an outer vessel of insulation material, a naked electric coil therein, a secondary solution which is dielectric, and an inner cooking vessel containing the material to be cooked.
Figure 2:
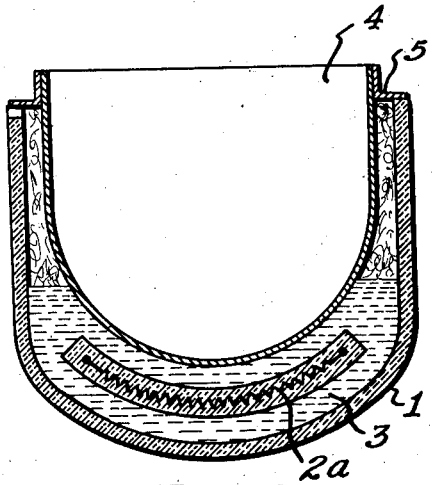
Fig. 2 is a section showing a similar construction but with a secondary solution which is not a dielectric, and in which the heating coil is housed in a protective casing.
Figure 3:
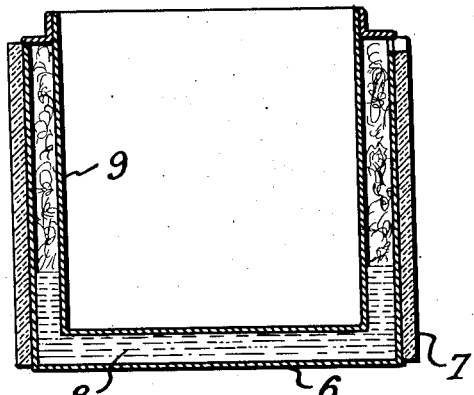
Fig. 3 is a section showing an outer vessel which is heat conductive, and is supposed to be mounted over a burner, with the secondary solution, and inner cooking vessel in place.

In the various cooking vessels shown (the showings are diagrammatic), the inner vessel does not block the escape of steam from the outer vessel except by its weight, so that pressures will not build up above the secondary solution. In accordance with previous explanation the secondary liquid does not boil therefore does not create appreciable pressures. In Figs. 1, 2 and 3 the seal is provided merely to retain the vapors within the outer vessel. In the drying roll devices the provision for escape of vapors may be arranged as desired, and is not illustrated specifically.

In Fig. 1, the outer vessel 1 may be formed of highly non-conductive material to heat, such as pressed fibre, glass, plastics, crockery, etc., with added insulation where desired. The heat is supplied by a resistance coil or heating element 2 in which the wires are left bare, because the secondary solution 3 will be a good dielectric such as a modified water solution, in which the modifying agent will not make an electrolyte out of it. The inner vessel 4 will be of good heat conductive material and will preferably be of light weight, such for example, thin aluminum ware. It will have a flange which as shown at 5, will rest on the rim of the outer vessel closing off the space between the two vessels. The amount of secondary solution should be such as to cover a substantial portion of the walls as the bottom of the inner vessel.

In Fig. 2 in which the parts have been marked with the same numbers except for the heating coil 2a, it will be noted that here the coil is housed and insulated, so that an electrolyte liquid can be employed for the secondary liquid.

In Fig. 3 the outer vessel 6 has a metal base which will be suitable to set over a flame. It may have its walls insulated as by insulation 7. The secondary liquid is shown at 8 and the inner vessel at 9, resting against the outer vessel at the top as before.

Although not shown, the inner vessel could be fluted as to its walls to increase its surface for contact with the heat supply media.

Figure 4:
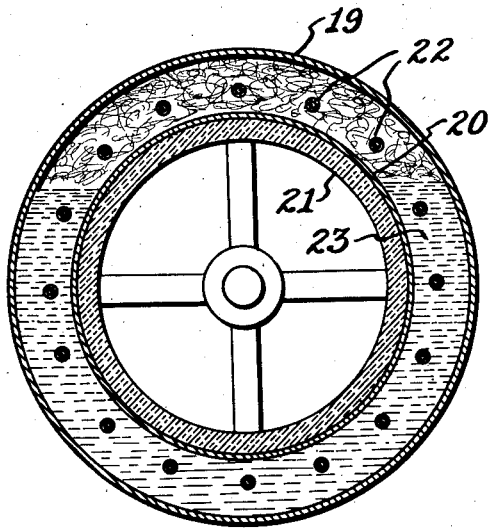
Fig. 4 is a cross section of a jacketed drying roll in which the secondary solution is heated directly in the jacket of the roll.

In Fig. 4, the outer surface of the roll is shown at 19, and the inner sleeve or shell 20, the latter being of heat insulation material, or properly insulated as indicated at 21. The electric heating elements are within the jacket between the two shells as indicated at 22. The secondary liquid is shown at 23. I have not illustrated the brushes for transmitting the heating current to the roll.

To illustrate the use of my process of cooking or drying let us assume the problem of cooking in water of a cereal.

In this practice the cereal and water are placed into the inner vessel and heat applied to the secondary solution. If it is desirable for such cooking to keep the inner vessel boiling, for this purpose the secondary solution will be arranged to have a boiling point of 225–230° F. A solution of water and glycerine 40 to 50 parts of glycerine to 100 parts of water will give a properly adjusted boiling point for this purpose.

It is desirable, however, for any cooking to keep the inner vessel below its boiling point. Reason: This will eliminate any disadvantages which may result from pressures being developed in the outer chamber. It is only when the quantity of heat applied to the heating medium is in excess of the rate at which the inner vessel can absorb same, that the boiling point of the heating medium in the outer vessel is reached. One of the particular advantages of this process is that I can transfer desired quantities of heat without reaching the boiling points and the consequent disadvantages of possible building up of pressures.

The mechanics of the cooking action have been described or referred to. The electrical input while the apparatus is coming up to temperature can be as desired—say for a kitchen utensil made according to my invention using the heating coil type of operation—1200 watts. As soon as the secondary solution gets to its boiling point, which will be accompanied by the water in the inner vessel being heated up also, the electrical input can be shut down to say 35 watts.

This will be about the amount of heat used to keep the water boiling in the inner vessel. It locally overheats the secondary solution which is at its boiling point creating vapors in an inactive manner, which vapors rise, contact with the inner vessel and condense, thus converting the latent heat of vaporization stored up therein, into heat applied to the inner vessel. Vapors rising in the space above the secondary liquid will largely condense on the walls of the inner vessel also, there being a very slight escape of the secondary solution in the form of vapor. Such escape would have to be by lifting the inner vessel slightly, or leaking around its seat in the outer vessel.

The amount of energy supplied in any given instance need be no more than that necessary to keep up the boiling in the inner vessel, and at no time will the inner vessel be contacted with heat higher than the boiling point temperature of the secondary solution.

The cooking will be rapid, and economical, and no local burning against the walls of the inner vessel will take place.

Suppose now that we were to cook candy which requires a boiling temperature of 240 to 250 degrees F. This will require increasing the glycerine content of the secondary solution to give it a boiling point of 250 to 260 degrees F. Again no burning will take place. Stirring is not required to prevent burning. No more heat is required than enough to overcome the slight losses due to such vaporization of the secondary solution as cannot be prevented, and to overcome the losses due to radiation from the outer vessel which will be slight, due to its composition. The very large proportion of the heat will be applied to the cooking vessel.

Referring now to the type shown in Fig. 3. Here the heat is imparted from without. There will naturally be much greater losses. However, the secondary solution will as before not rise in temperature above its boiling point, and the mechanics of latent heat transfer will progress as indicated above.

Where the temperature required is less than the boiling point of water, other media than water as the secondary solution will be employed in which the latent heat of vaporization can be employed as before, there being no necessity of more than 10 or 15 degrees differential between the temperature required for the heat treatment of the product in the inner vessel. There will be no danger of overheating, no necessity of supplying more heat than necessary to maintain the action desired in the material being treated, and the losses that will occur in boiling off the secondary solution can be controlled by changing the amount of heat supplied.

The liquids I used for cooking solutions are selected with regard to properties such as specific heat, thermal conductivity, dielectric or non-conducting properties, stability, inertness, corrosive effect on equipment, fluidity, frothing, odors and general effect on humans and equipment. I have successfully used neutral solutions of inorganic salts such as ammonium sulphate, $CaCl_2$, ferric chloride, magnesium chloride, potassium carbonate and nitrate, sodium carbonate, chloride, sulphate, phosphate, theosulphates and zinc sulphates. Organic liquids such as acetic, aformic, lactic, acids, glycerine, sugar solutions, etc. All these are suitable for the structure of Figs. 2 and 3, but for Fig. 1 a solution of low dielectric or non-electrical conducting properties must be used. Because of low cost, availability, high concentrations possible to produce a wide range of boiling points (212°–350° F.), thermal conductivity, specific heat, stability, etc. solutions of $CaCl_2$ (treated with inhibitors to prevent corrosion of aluminum and copper equipment) will be useful to illustrate mechanics of operation of my process. $KNO_3$ is also especially suitable but does not permit as wide a range in temperature. Glycerine also permits a wide range in temperature (boiling points up to 327° F.)

In drying it will be evident that the same mode of operation takes place, in this instance the heat conducted away from the apparatus being largely consumed in the act of drying the moisture from the material passing around the drying roll. The slight temperature gradient here will still be maintained, as before and as has been noted, escape of vapors regulated so as to insure against overheating.

In the drying of many papers this will be of high value.

Having thus described my invention, what I claim as new and desire to secure by Letters Patent is:

1. In a process of cooking and drying the step which consists in applying heat to the medium to be treated by means of a treating liquid maintained substantially at or lower than its boiling point, but sufficiently high to cause vaporization locally therein, said boiling point being only slightly higher than the temperature desired to be applied to said medium, and said medium being held at a pressure at which said boiling point will develop.

2. In a process of cooking and drying the step which consists in applying heat to the medium to be treated by means of a treating liquid maintained substantiallly at or lower than its boiling point, said boiling point being at a temperature of the order to ten to twenty degrees F. higher than the temperature desired to be applied to said medium.

3. In a process of boiling substances in water, the step of supplying the heat for boiling by contact with a solution having a boiling point only slightly higher than 212 degrees F., said solution being held at substantially its boiling point, so as to set up vaporization, said solution being held at a pressure at which said boiling point will develop.

4. In a process of cooking and drying the step which consists in applying heat to a heat conductive surface which is in contact with the medium to be treated, the heat being applied by a treating liquid maintained at or lower than its boiling point, but sufficiently high to cause vaporization locally therein, said boiling point being higher but only slightly higher than the required temperature of the surface to maintain the desired temperature for the medium to be treated, said treating liquid being held at a pressure at which said boiling point will develop.

5. In a process of cooking and drying the step which consists in applying heat to a heat conductive surface which is in contact with the medium to be treated, the heat being applied by a treating liquid maintained at or lower than its boiling point, said boiling point at the pressure which prevails being higher but only slightly higher than the required temperature of the surface to maintain the desired temperature for the medium to be treated, the difference in temperature referred to being of the order of ten to twenty degrees.

6. A cooking apparatus consisting of an outer vessel of high heat insulation material, an inner vessel supported therein, and a treating liquid in the said vessel having a boiling point only slightly higher than that desired to be applied to the inner vessel, means being provided to maintain a pressure which permits said boiling point to develop.

7. A cooking apparatus consisting of an outer vessel of high heat insulation material, an inner vessel supported therein, and a treating liquid in the said vessel having a boiling point only slightly higher than that desired to be applied to the inner vessel at the pressure which prevails, and an electric heating coil submerged in the said treating liquid to apply the heat thereto.

8. A drying apparatus consisting of a jacketed drum, and means for supplying in the said jacket, a treating liquid at or lower than its boiling point, said boling point at the pressure which prevails being only slightly above that of the desired temperature for the surface of the drum while in use in drying, there being sufficient heat supplied to set up some local vaporization of the treating liquid.

9. A drying apparatus consisting of a jacketed drum, and means for supplying in the said jacket, a treating liquid at or lower than its boiling point, said boiling point being only slightly above that of the desired temperature for the surface of the drum while in use in drying, said jacket containing electric heating coils for this purpose, and means for maintaining a pressure at which said boiling point develops.

10. A cooking apparatus consisting of an outer vessel of high heat insulation material, an inner vessel supported therein, and a treating liquid in the said vessel having a boiling point only slightly higher than that desired to be applied to the inner vessel, and an electric heating coil submerged in the said treating liquid to apply the heat thereto, said heating coil being of bare resistance wire, and said treating liquid being a dielectric, and means for maintaining a pressure at which said boiling point develops.

11. In a process of cooking and drying the step which consists in applying heat to the medium to be treated by means of a treating liquid maintained substantially at or lower than its boiling point, said boiling point at the pressure which prevails being only slightly higher than the temperature desired to be applied to said medium, and controlling the heat input into the treating liquid to set up local vaporization but limited so as to prevent escape of vapors therefrom in substantial quantity, which are not condensed due to said temperature differential.

12. In a process of cooking and drying the step which consists in applying heat to the medium to be treated by means of a treating liquid maintained substantially at its boiling point, said boiling point at the pressure which prevails being at a temperature of the order to ten to twenty degrees F. higher than the temperature desired to be applied to said medium, and controlling the heat input into the treating liquid to set up local vaporization but limited so as to prevent escape of vapors therefrom in substantial quantity, which are not condensed due to said temperature differential.

13. In a process of cooking and drying the step which consists in applying heat to a heat conductive surface which is in contact with the medium to be treated, the heat being applied by a treating liquid maintained at or lower than its boiling point, said boiling point at the pressure which prevails being higher but only slightly higher than the required temperature of the surface to maintain the desired temperature for the medium to be treated, and controlling the heat input into the treating liquid to set up local vaporization but limited so as to prevent escape of vapors therefrom in substantial quantity, which are not condensed due to said temperature differential.

14. In a process of cooking and drying the step which consists in applying heat to a heat conductive surface which is in contact with the medium to be treated, the heat being applied by a treating liquid maintained at its boiling point, said boiling point at the pressure which prevails being higher but only slightly higher than the required temperature of the surface to maintain the desired temperature for the medium to be treated, the difference in temperature referred to being of the order of ten to twenty degrees, and controlling the heat input into the treating liquid to set up local vaporization but limited so as to prevent escape of vapors therefrom in substantial quantity, which are not condensed due to said temperature differential.

15. In a process of cooking and drying the step which consists in applying heat to a heat conductive surface which is in contact with the medium to be treated, the heat being applied by a treating liquid maintained at or lower than its boiling point, said boiling point at the pressure which prevails being higher but only slightly higher than the required temperature of the surface to maintain the desired temperature for the medium to be treated, and controlling the heat input into said solution to set up local vaporization but limited so that substantially all of the vapors thereof condense in the operation.

LEON H. LARSON.